July 6, 1943.  S. G. SEIDEL ET AL  2,323,852
DEVICE FOR OPENING AND EMPTYING CARTONS
Filed July 14, 1942  12 Sheets-Sheet 1
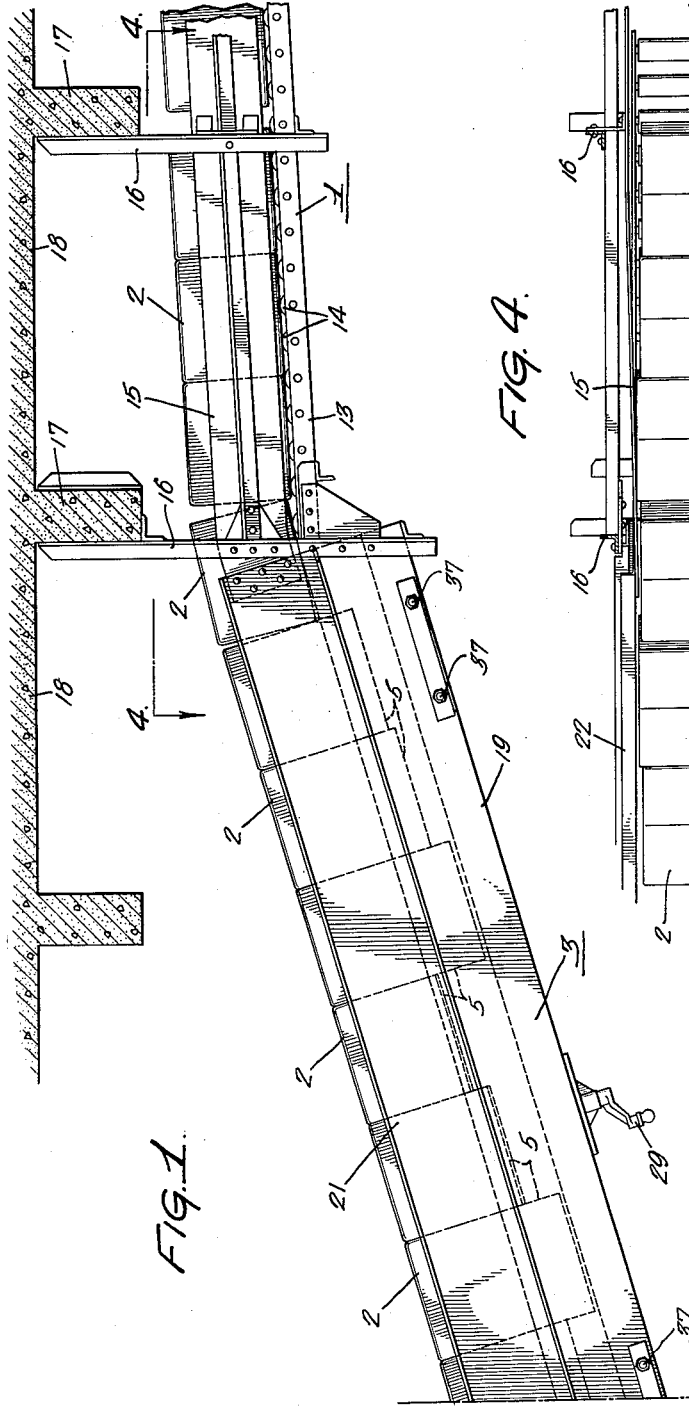
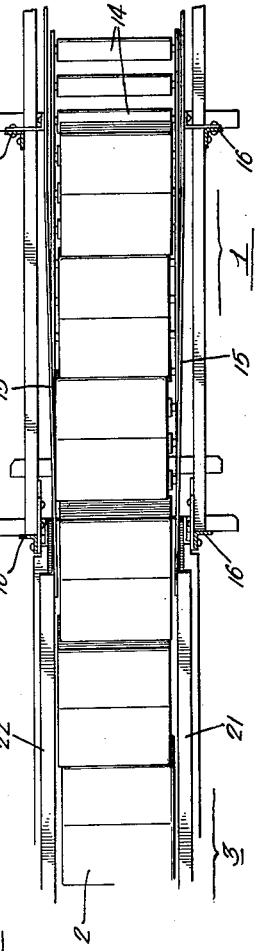
Inventors:
Stephen G. Seidel
Robert P. Lownes
by their Attorneys
Howson & Howson

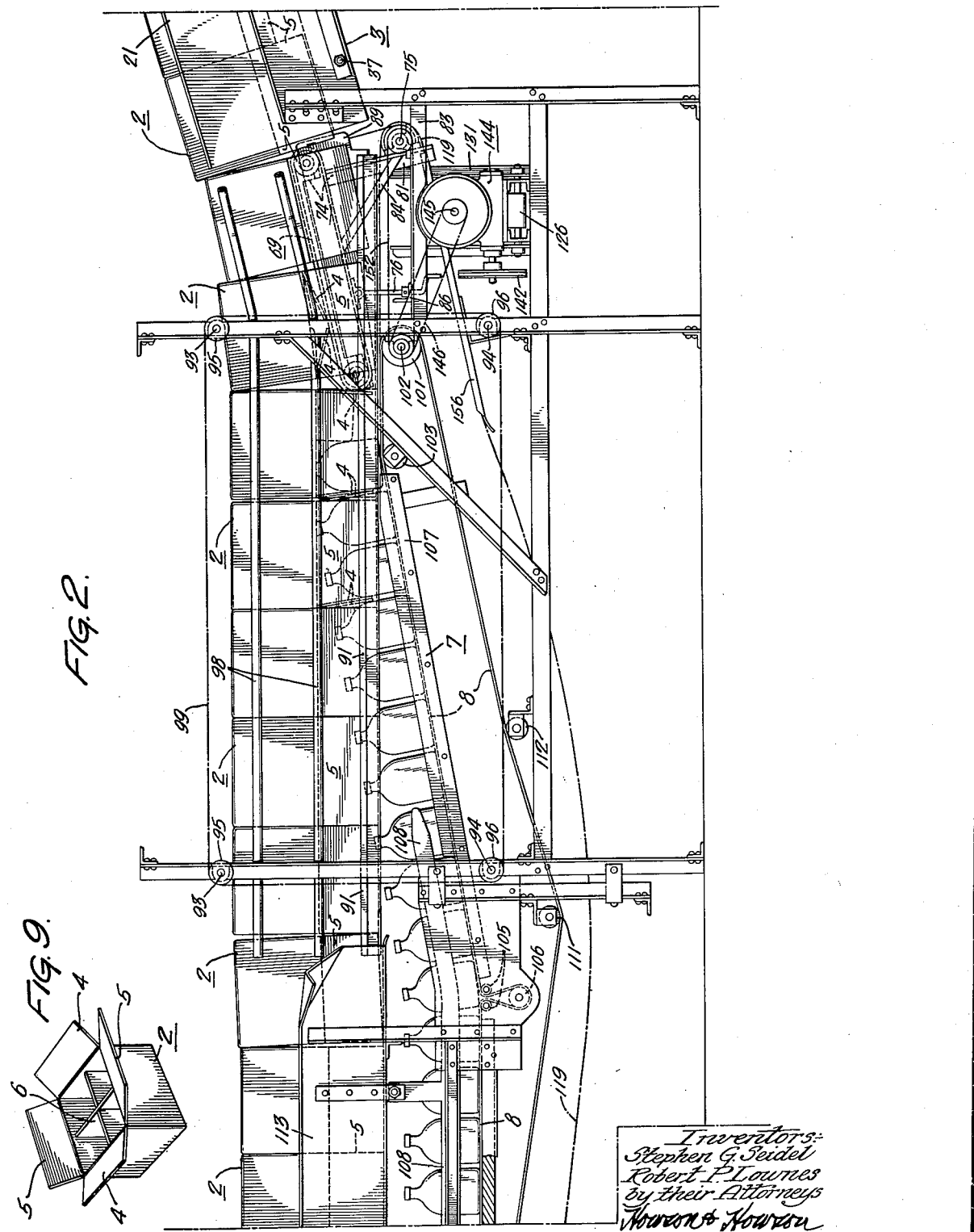

July 6, 1943. S. G. SEIDEL ET AL 2,323,852
DEVICE FOR OPENING AND EMPTYING CARTONS
Filed July 14, 1942 12 Sheets-Sheet 3
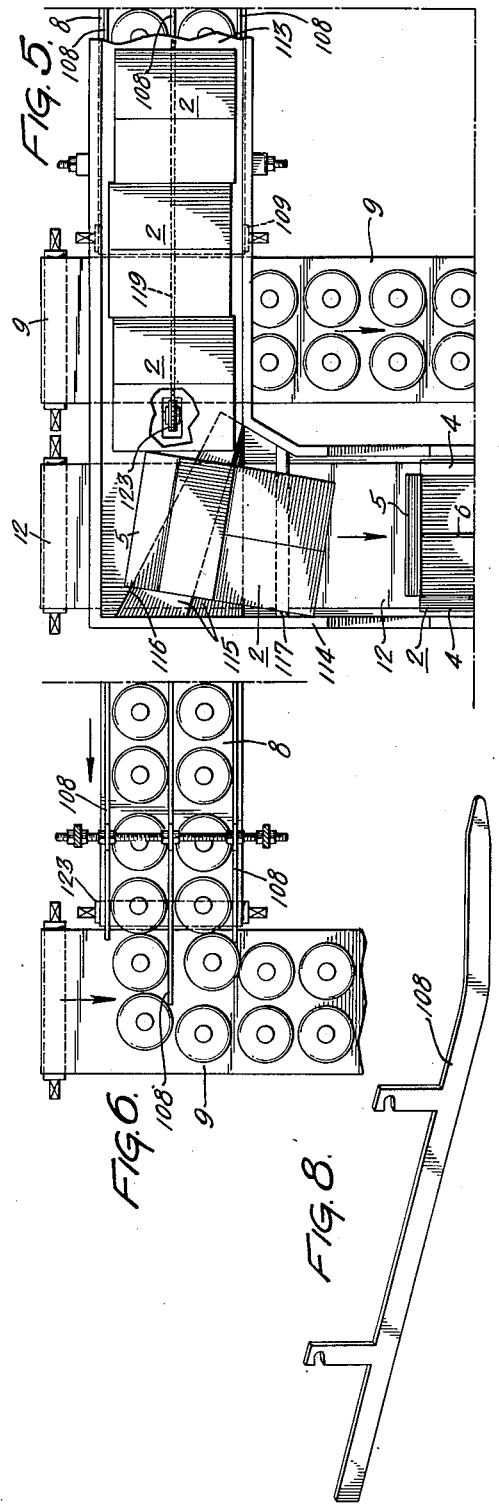
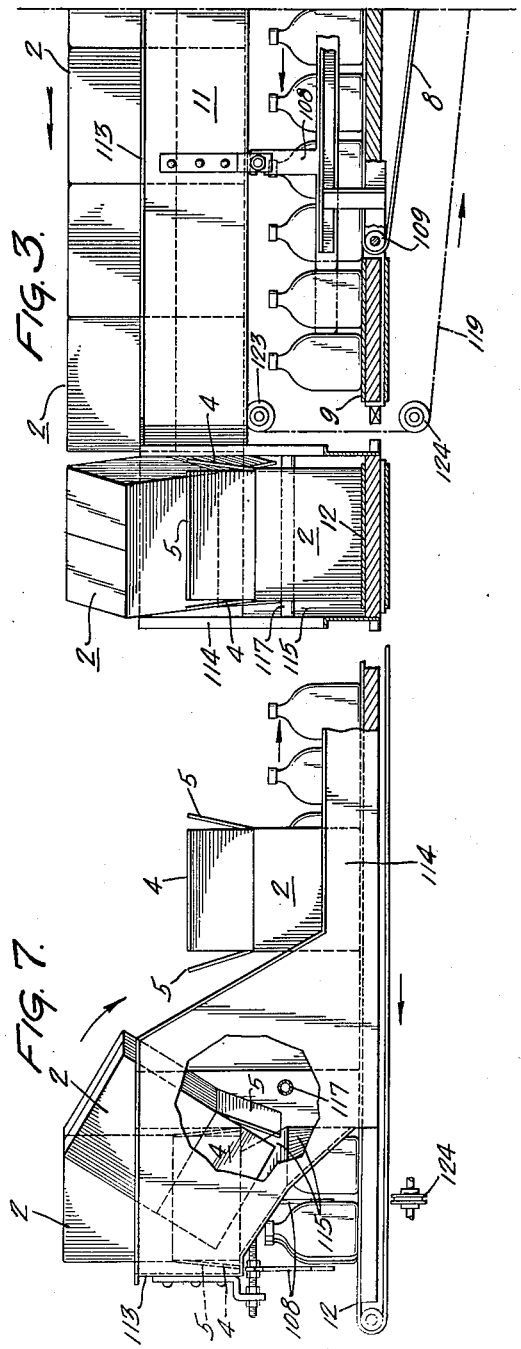
Inventor:
Stephen G. Seidel
Robert P. Lownes
by their Attorneys
Howson & Howson July 6, 1943.  S. G. SEIDEL ET AL  2,323,852
DEVICE FOR OPENING AND EMPTYING CARTONS
Filed July 14, 1942  12 Sheets-Sheet 4
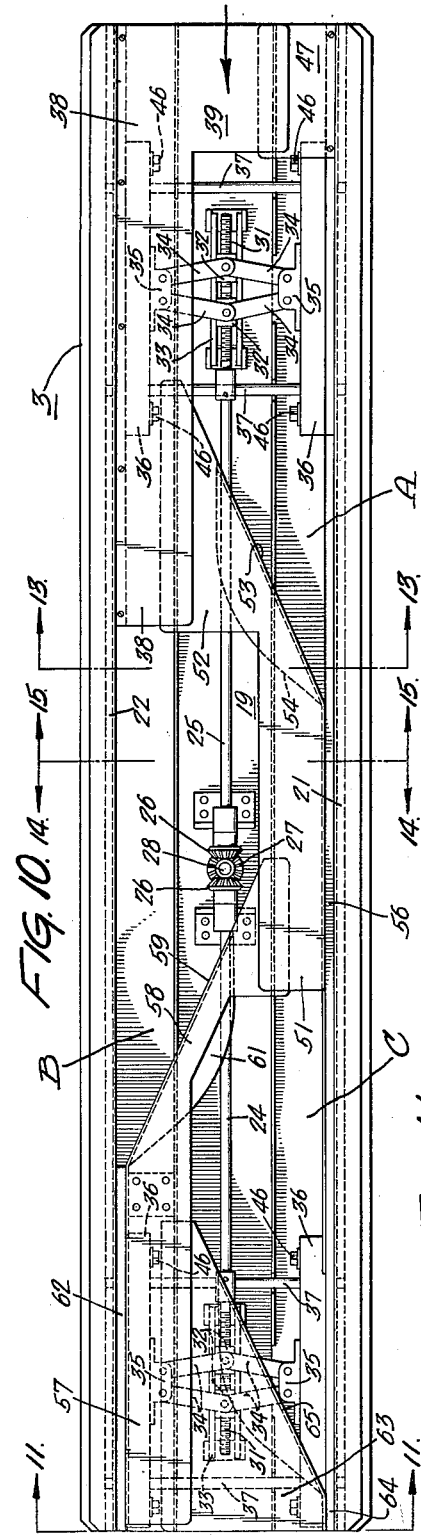
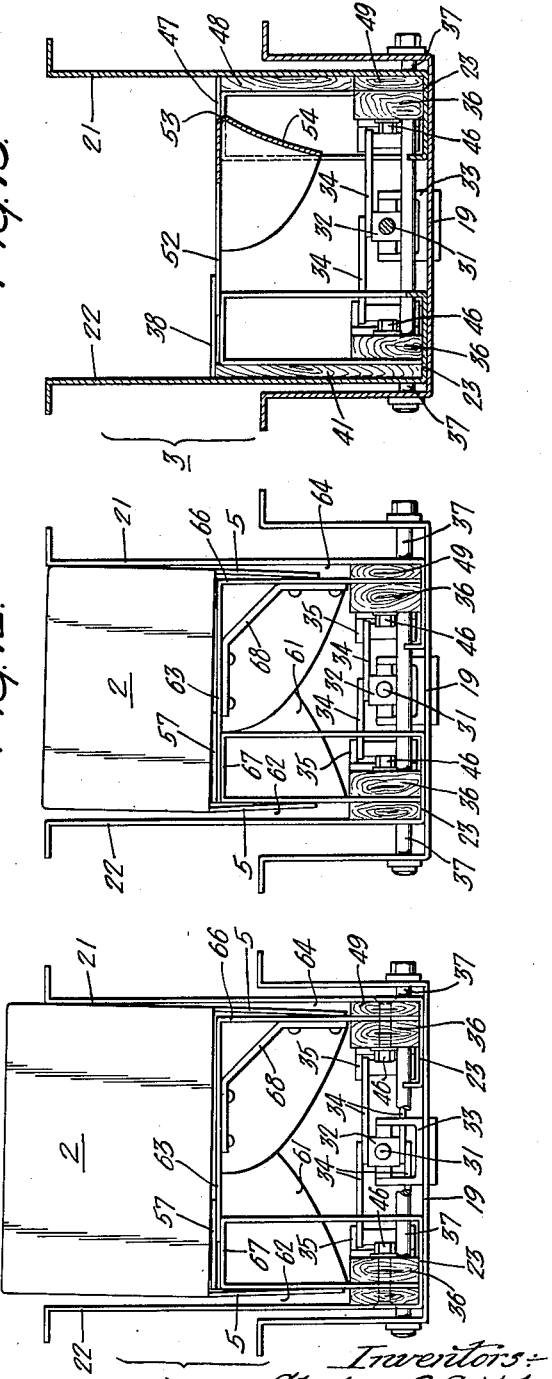
Inventors:
Stephen G. Seidel
Robert P. Lownes
by their Attorneys
Howson & Howson

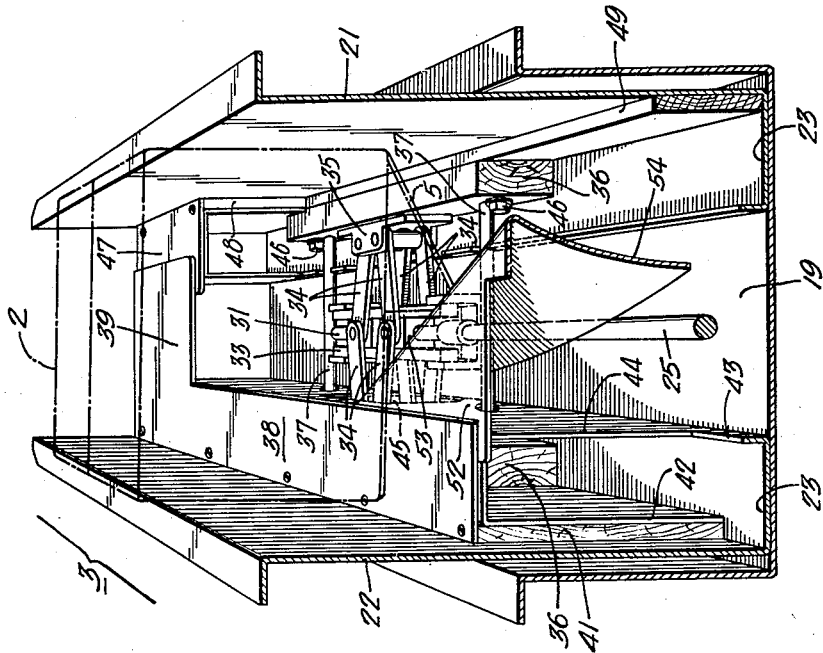
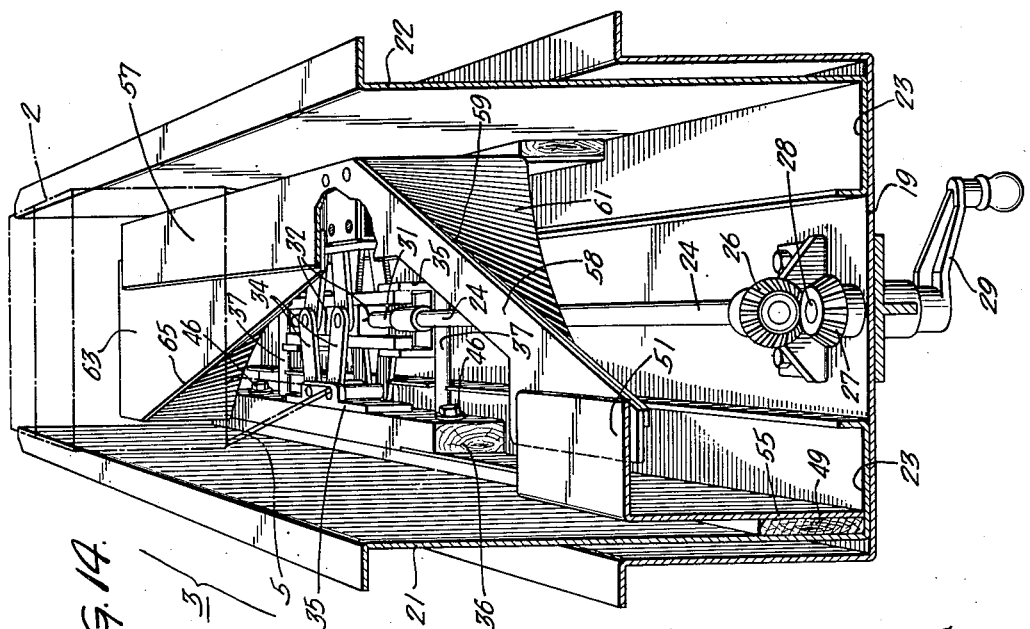

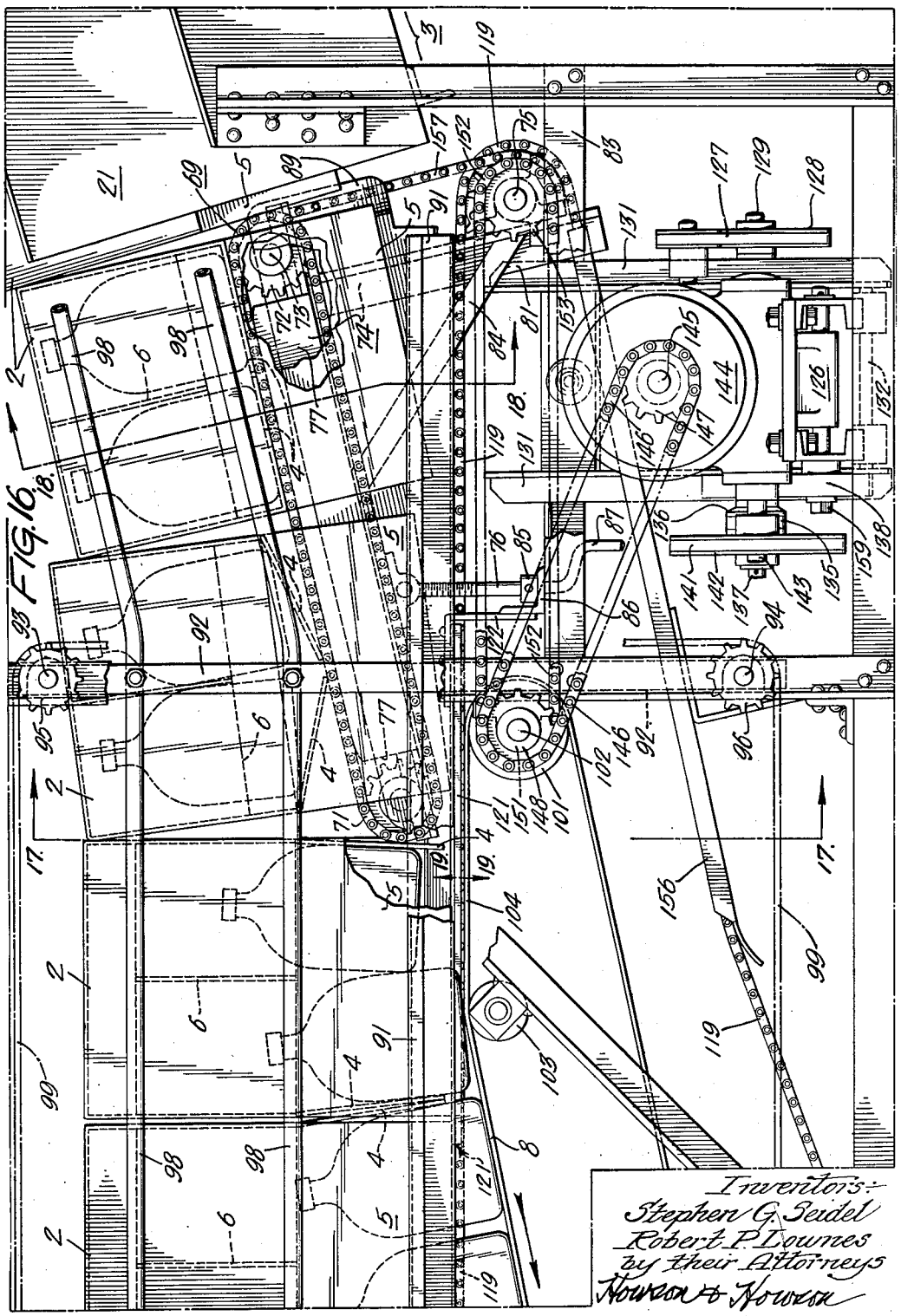

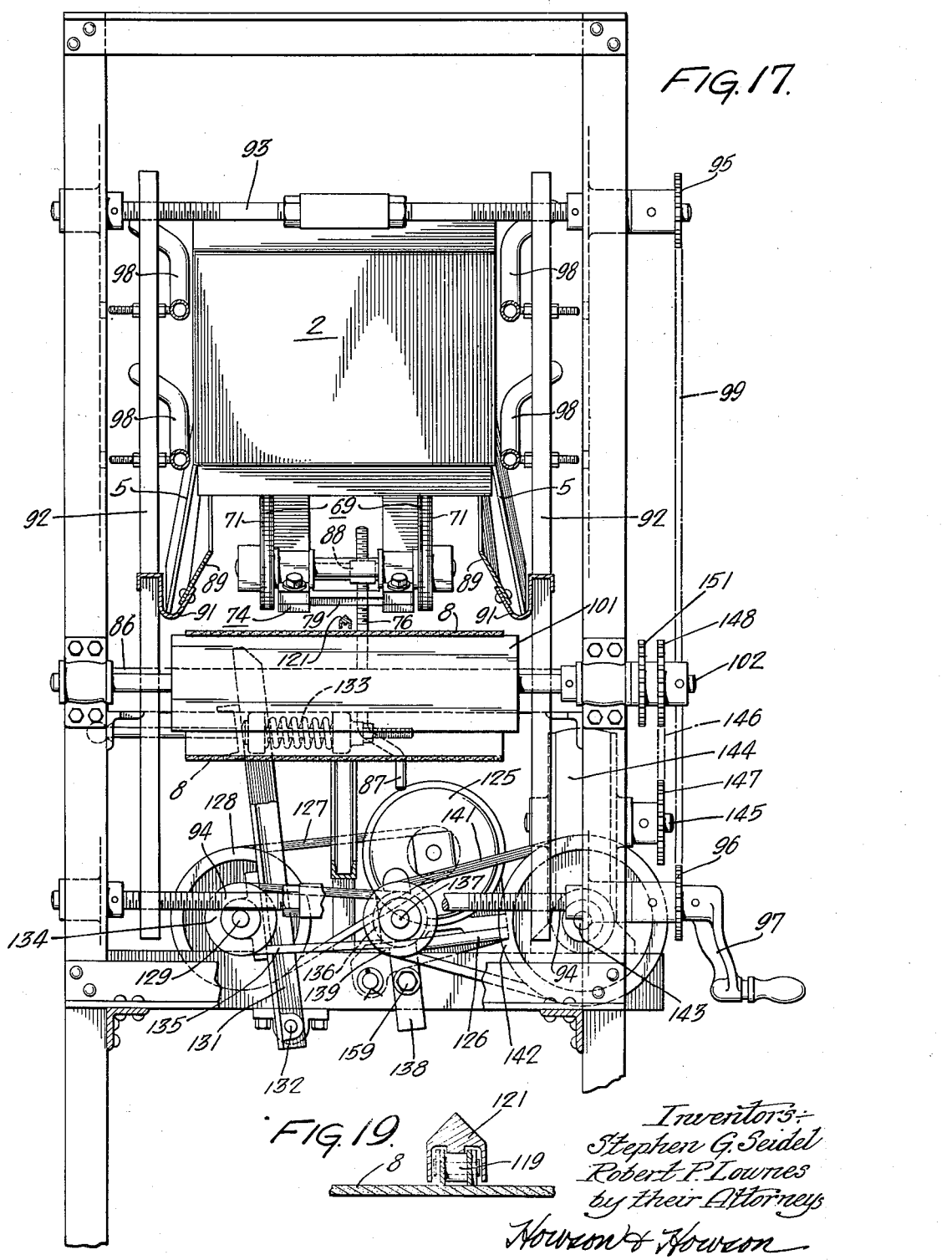

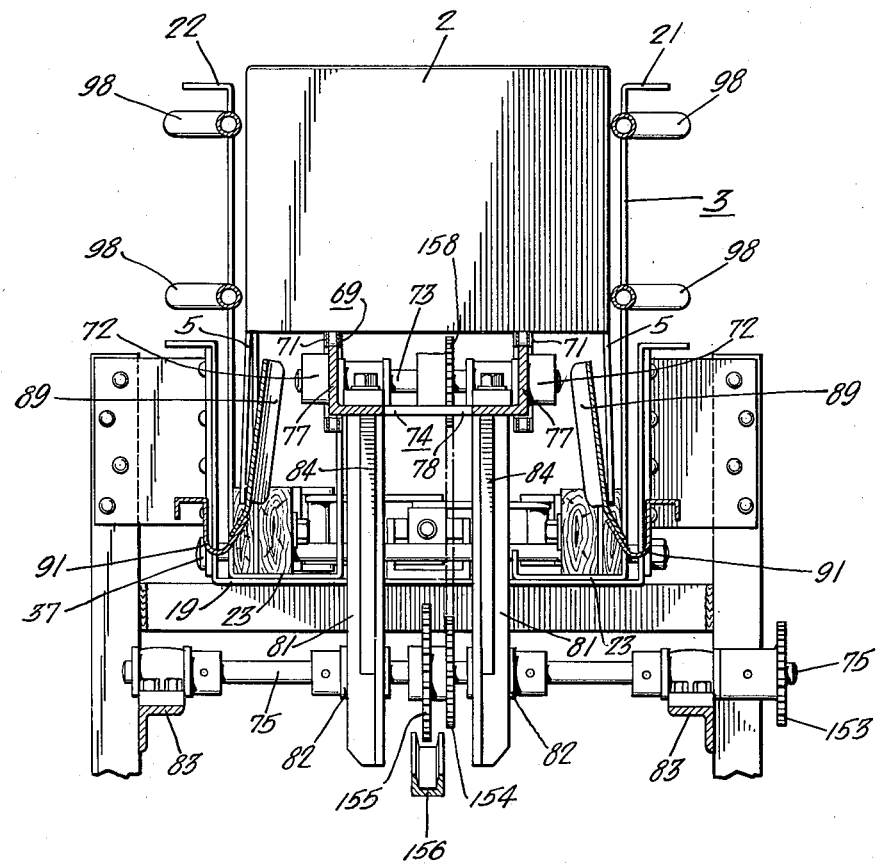

July 6, 1943.   S. G. SEIDEL ET AL   2,323,852
DEVICE FOR OPENING AND EMPTYING CARTONS
Filed July 14, 1942   12 Sheets-Sheet 9
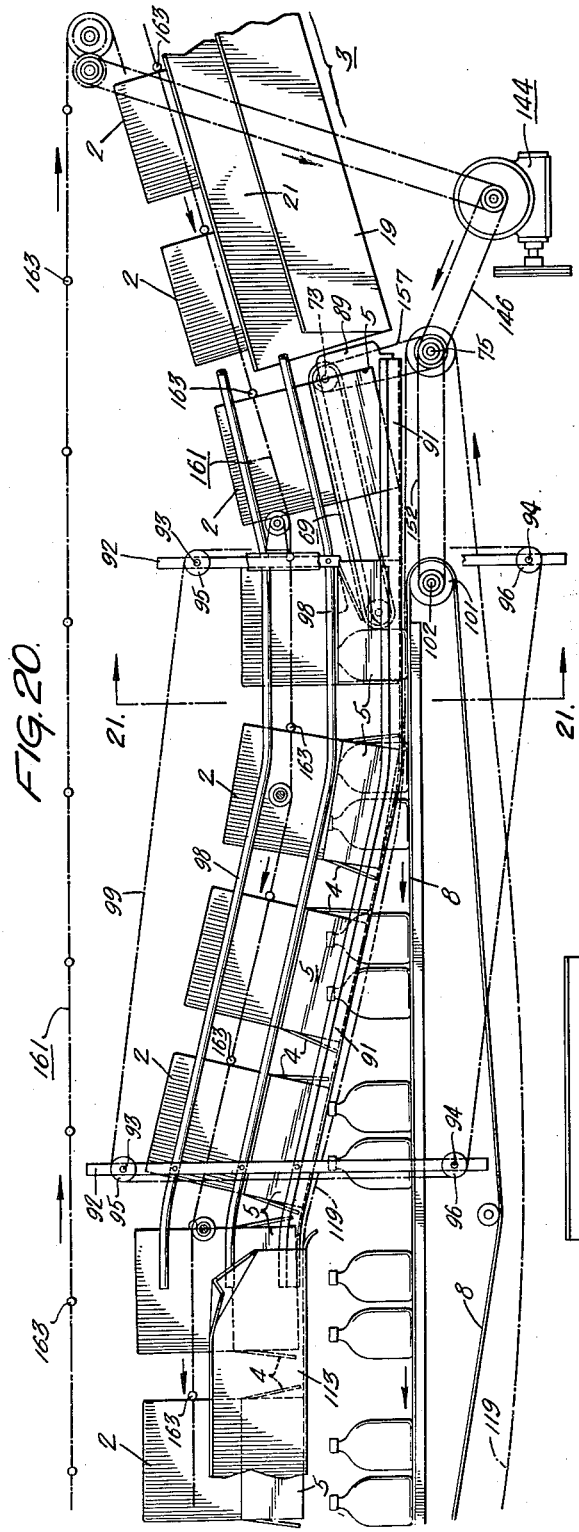
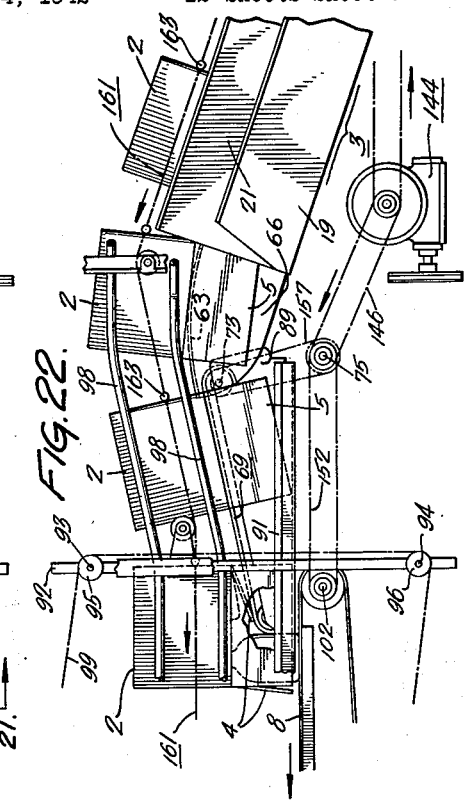

July 6, 1943. S. G. SEIDEL ET AL 2,323,852
DEVICE FOR OPENING AND EMPTYING CARTONS
Filed July 14, 1942 12 Sheets-Sheet 10
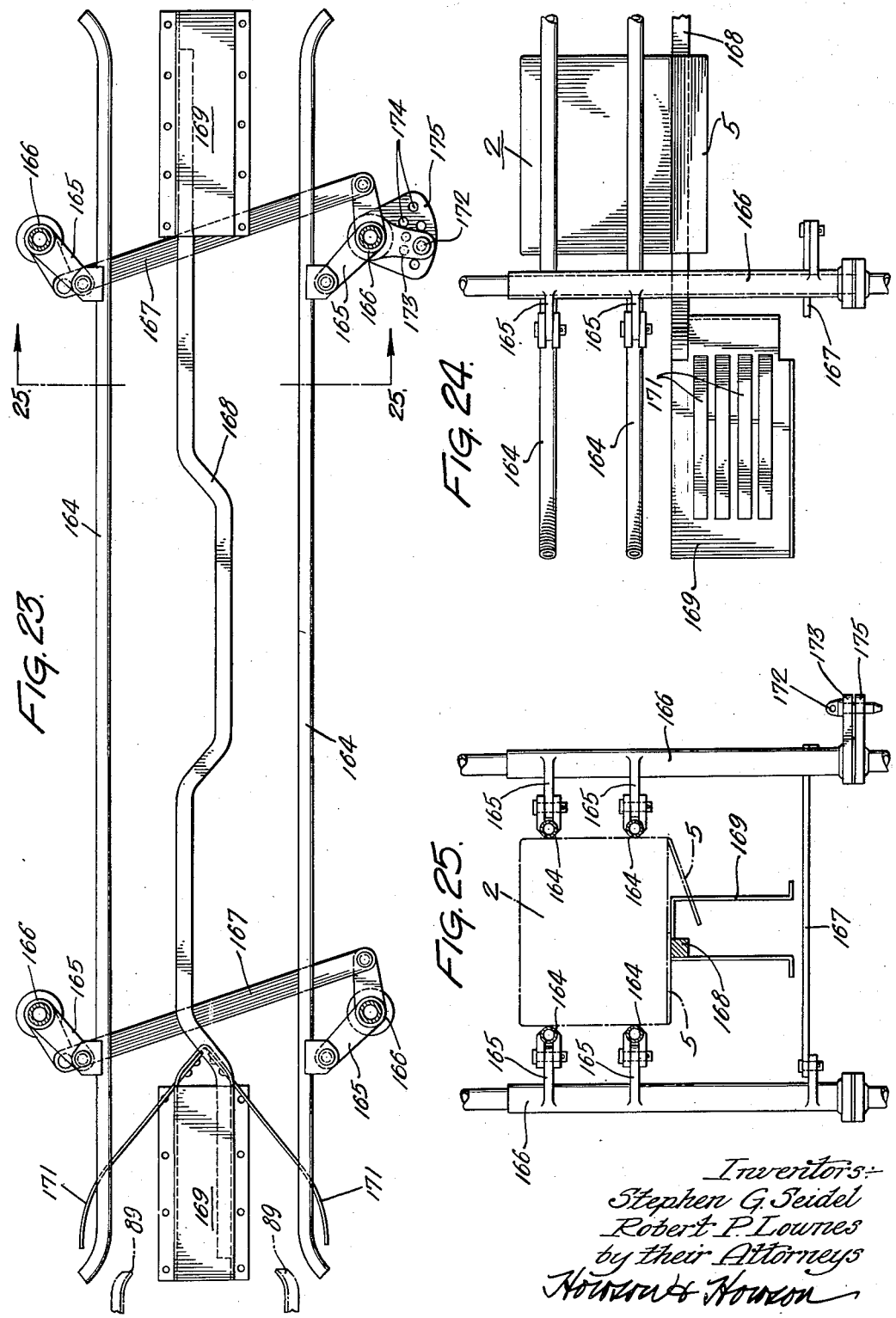
Inventors:-
Stephen G. Seidel
Robert P. Lownes
by their Attorneys
Howson & Howson

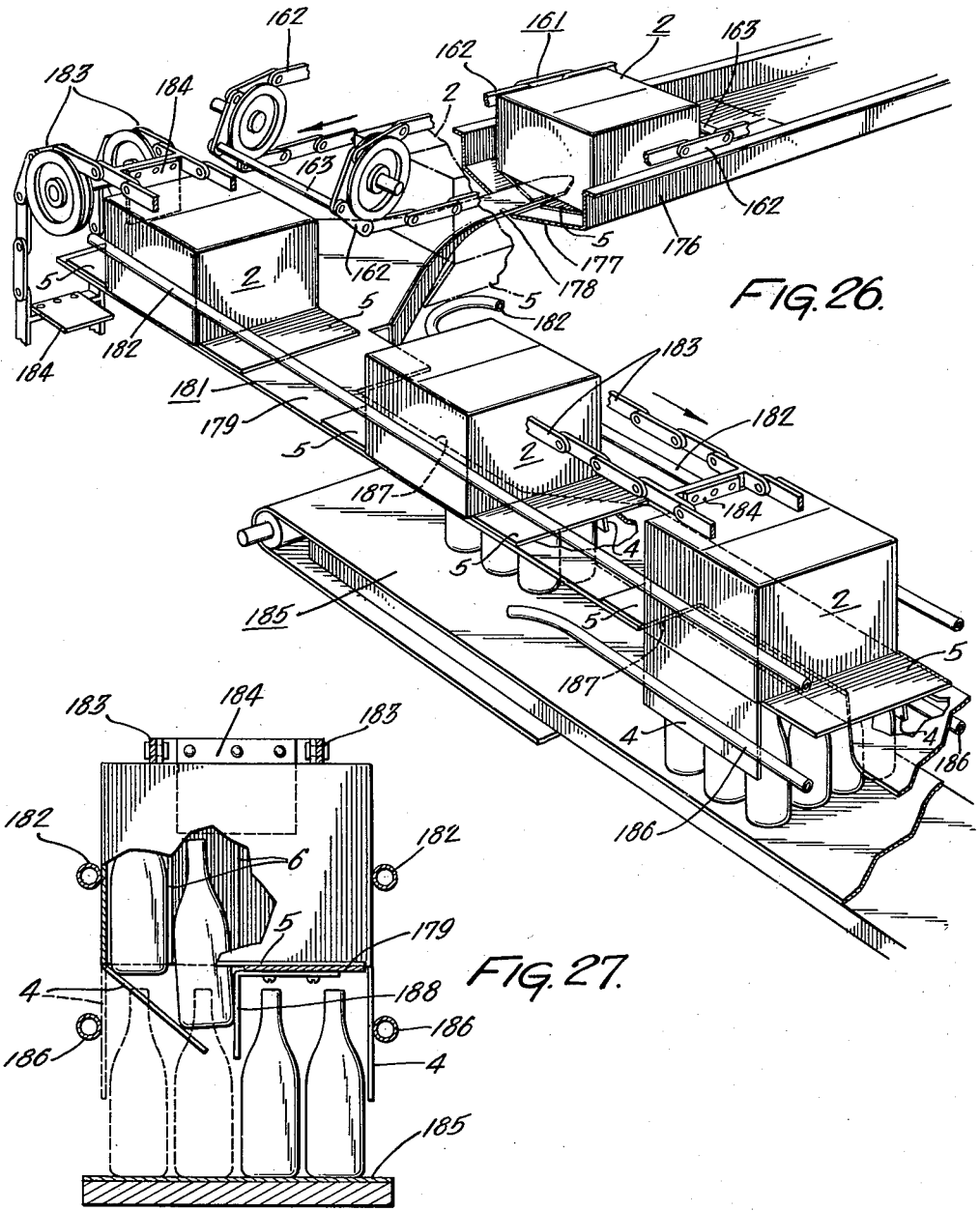

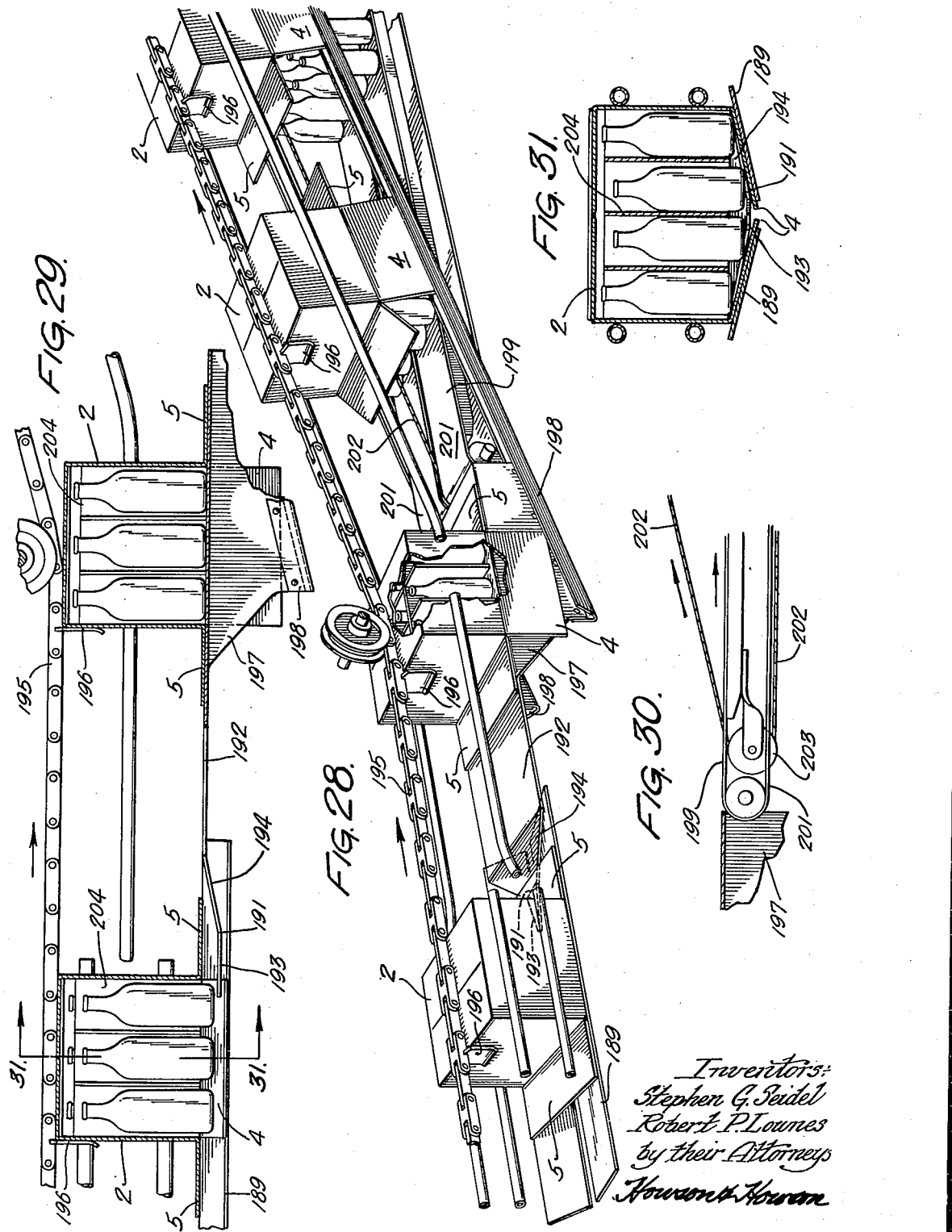

Patented July 6, 1943

2,323,852

UNITED STATES PATENT OFFICE 2,323,852

DEVICE FOR OPENING AND EMPTYING CARTONS

Stephen G. Seidel and Robert P. Lownes, Philadelphia, Pa.

Application July 14, 1942, Serial No. 450,942

20 Claims. (Cl. 214—1.1)

This invention relates to devices for automatically opening and emptying cartons containing bottles and the like, and the principal object of the invention is to provide a simple and generally improved device of this class.

Another object of the invention is to provide a device of the stated character that is capable of operating continuously upon successive cartons which may be fed to the opening and emptying portions of the apparatus by means of a suitable conveyer, the bottles and cartons after emptying being conveyed separately to a remote station or stations for subsequent operations.

A continuously operating device of this character is of particular value in bottling plants wherein it provides a means for automatically removing the bottles from the original cartons and for delivering the bottles by conveyer to the cleaning and bottling machines. It is possible, for example, with a device of this character to route the bottle-containing cartons in continuous operation over a cyclic path through the bottling plant, wherein the bottles are removed from the cartons, washed, sterilized, filled and repackaged in the original cartons, said path beginning and terminating, for example, in a freight car which originally transported the cartons with the empty bottles to the plant and which may also be used to transport the bottled goods to a point of final destination.

The invention resides further in certain structural and mechanical details and arrangements hereinafter described and illustrated in the attached drawings, in which:

Figures 1, 2 and 3 show in side elevation contiguous sections of the opening and emptying apparatus forming the subject of the invention;

Fig. 4 is a top plan view of the portion of the device embraced by the line 4—4, Fig. 1;

Fig. 5 is a top plan view of the portion of the mechanism shown in Fig. 3;

Fig. 6 is a top plan view of a portion of the mechanism shown in Figs. 3 and 5;

Fig. 7 is an end elevational view of the portion of the mechanism shown in Fig. 3;

Fig. 8 is a view in perspective of one of the elements of the assembly shown in the preceding figures;

Fig. 9 is a view in perspective of one of the bottle-containing cartons;

Fig. 10 is a plan view of the portion of the device shown at the left-hand side of Fig. 1 and the right-hand side of Fig. 2;

Fig. 11 is an end elevational view from the line 11—11, Fig. 10;

Fig. 12 is a view corresponding to Fig. 11 showing the apparatus adjusted for cartons of relatively small size;

Fig. 13 is a section on the line 13—13, Fig. 10;

Figs. 14 and 15 are views in perspective in opposite directions as viewed from the lines 14—14 and 15—15, respectively, Fig. 10;

Fig. 16 is an enlarged side elevational view of that portion of the mechanism shown at the right-hand end of Fig. 2;

Fig. 17 is a section on the line 17—17, Fig. 16;

Fig. 18 is a section on the line 18—18, Fig. 16;

Fig. 19 is an enlarged sectional view on the line 19—19, Fig. 16;

Fig. 20 is a side elevational view illustrating a modification within the scope of the invention;

Fig. 21 is a section on the line 21—21, Fig. 20;

Fig. 22 is a side elevation illustrating a still further modification;

Fig. 23 is a top plan view illustrating still another modification within the scope of the invention;

Fig. 24 is a fragmentary side elevational view of a portion of the mechanism shown in Fig. 23;

Fig. 25 is a section on the line 25—25, Fig. 23;

Fig. 26 is a view in perspective illustrating another modification within the scope of the invention;

Fig. 27 is a transverse sectional view illustrating the mode of operation of the device shown in Fig. 26;

Fig. 28 is a view in perspective illustrating still another modification along the line shown in Fig. 26;

Figs. 29 and 30 are fragmentary longitudinal sectional views showing details of the apparatus illustrated in Fig. 28, and Fig. 31 is a section on the line 31—31, Fig. 29.

With reference particularly to Figs. 1, 2 and 3 of the drawings, the device forming the subject of the present invention comprises a conveyer 1 which is adapted to feed the unopened cartons 2 with their contained empty bottles either by gravity or by other suitable means to the upper end of an inclined section 3 containing the means for in part opening the cartons so as to permit the bottles to escape therefrom. The cartons, which may be of the typical form shown in Fig. 9, are placed upon the conveyer 1 so that the unsealed closing flaps 4, 4 and 5, 5 are at the under side; and the bottles, which are separated by a partitioning element 6 set loosely in the carton, are originally inserted in the cartons so that when the latter is placed on the conveyer as described, the bottles will be in upright positions.

From the inclined section 3, the cartons pass to a section designated by the reference numeral 7, wherein the flaps 4 and 5 are fully opened so as to permit the bottles to pass from the carton to an underlying conveyer 8 on which they are carried to a cross conveyer 9 for transfer to a remote point not shown. The cartons 2 are advanced on an upwardly diverging guide 11 which extends over the conveyer 8, and are eventually transferred to a cross conveyer 12, means being provided, as hereinafter described, for inverting the carton so that it is received on the conveyer 12 in an upright position, as shown in Fig. 7.

The conveyer section 1 comprises in the present instance a suitable frame 13 which is slightly inclined toward the upper end of the section 3 and in which are journaled a plurality of free rollers 14 which support the cartons 2. Side plates 15 are provided for holding the cartons in place upon the rollers 14 and for guiding the cartons to the upper end of the section 3. It is to be understood that the conveyer section 1, of which only the end portion is shown, may be of any length and character to feed the cartons 2 with their contained bottles from a remote point to the upper end of the section 3. It will be noted that in the present instance the upper end of the latter section and the adjoining end of the section 1 are supported on suitable brackets 16 depending from beams 17 of a ceiling structure 18.

The section 3 is illustrated in detail in Figs. 10 to 15, inclusive. It consists of an elongated trough-like base frame 19 within which are mounted side plate members 21 and 22, these members being transversely adjustable in the trough 19 to vary the effective width of the section 3, as hereinafter described. Each of the plates 21 and 22 has an inturned flange 23 at the bottom which forms a footing for the plates in the bottom of the trough. Suitably journaled in the bottom of the trough 19 and extending longitudinally therefrom and in opposite directions from approximately the mid section are shafts 24 and 25. The adjoining ends of the shafts are provided with bevel pinions 26, 26 which mesh with a pinion 27 on the upper end of a stub shaft 28, this shaft extending upwardly through the bottom of the trough 19 and having at its lower end a crank arm 29 by means of which it may be manually turned to operate the shafts 24 and 25. Each of the shafts has at its opposite end a threaded terminal section 31 which engages a correspondingly threaded block 32, said blocks being slidably supported in guides 33 secured to and extending longitudinally of the bottom wall of the trough 19. To the top and bottom of each of the blocks 32 is pivotally connected a pair of links 34, 34, the outer ends of the links of each pair being pivotally connected, respectively, to brackets 35 which are secured to the inner faces of beams 36 bolted to the side plates 21 and 22. The extremities 31 which respectively engage the blocks 32 are oppositely threaded so that rotation of the shafts 24 and 25 results in a sliding movement in opposite directions of the associated blocks 32 in the respective guides 33. Under these circumstances, the links 34 act after the manner of toggles to draw the side plates 21 and 22 together or to further separate them, depending on the direction of rotation of the shafts. By rotating the crank 29, therefore, the effective distance between the side plates 21 and 22 may be varied as required. It will be noted that bolts 37 are supported in the side walls of the trough 19 and extend between said side walls through the side plates 21 and 22 and the beams 36, these bolts functioning as guides to retain the plates 21 and 22 in a normal parallel position within the trough with the flanges 23 of the side plates in slidable engagement with the bottom of the trough as illustrated.

At the end of the section 3 which adjoins the delivery section 1, see Fig. 15, the side plate 22 has an inwardly projecting horizontal flange plate 38. This plate 38 has at the end of the section a portion 39 of relatively great width, and the remainder of the plate is relatively narrow as illustrated. The edge of the plate 38 which abuts the side plate 22 is secured to and is supported by a filler member 41, of wood in the present instance, which is confined between the inner face of the plate 21 and the inturned edge portion 42 of the plate 22. The bottom flange 23 of the plate 22 is turned upwardly at its inner edge, as indicated at 43, and a portion 44 of this flange 43 is extended upwardly to a point adjoining the under side of the plate 38, and then inwardly and downwardly along the inner face of the member 41. This extended portion 44 of the flange 43 is provided with an opening 45 for passage therethrough of the links 34 previously described, and it will be noted that the beams 36 are bolted against the inner face of the flange extension 42 by means of bolts 46 which extend through the said beams 36, the flange 42, the member 41, and the main wall of the side plate 22, thereby securing these parts rigidly together.

A flange plate 47 is similarly secured to the inner face of the side plate 21, and this plate 47 forms a seat for the transversely extended portion 39 of the plate 38, as shown in Fig. 15. The flange 23 of the plate 21 is extended upwardly under the plate 47 and inwardly and downwardly after the manner of the flange 44—42 previously described, and this upward extension of the flange 23 forms a seat for the plate 47. The inner edge of this plate is secured to an upward extension 48 of a filler member 49 which is secured against the inner face of the plate 21, and between that plate and the beam 36, as shown in Fig. 15.

Toward the center of the section 3 and spaced from the inner surface of the wall 21 is a platform 51 which as shown in Fig. 10 has a lateral extension 52 which extends transversely to a position immediately underlying the plate 38, this lateral extension 52 finding a seat upon the top of the inwardly turned portion 42—44 of the flange 23 of the plate 22. This is most clearly shown in Figs. 10, 13 and 15. The edge 53 of the transverse extension 52 which adjoins the end of the section 3 to which the section 1 is connected extends diagonally across the section, as illustrated in Figs. 10 and 15, and depending from this edge 53 is a flange 54.

With reference to Fig. 14, it is to be noted that the downturned inner edge portion 55 of the member 51 is spaced from the adjoining inner surface of the plate 21 by means of a filler member 49 which at this point extends from the bottom of the flange 23 of the plate 21 upwardly to a point well below the level of the platform 51. It will be noted that this leaves an open slot-like space between the inner surface of the plate 21 and the adjoining edge of the platform 51, this space being designated in Fig. 10 by the reference numeral 56.

At the opposite end of the section 3, the flange 23 of the plate 22 is formed to provide a platform 57 corresponding to the platform 51 described above. This platform 57 has a portion 58 which extends diagonally toward the wall 21, see Figs. 10 and 14, the extremity of this extension immediately underlying the proximate end of the platform 51. From the diagonal edge 59 of the extension 58 a flange 61 extends downwardly, this flange corresponding to the flange 54 of the extension 52 of the platform 51 previously described. It will be noted that the construction provides a slotted opening between the outer edge of the platform 57 and the inner face of the plate 22, this slotted space being designated in Fig. 10 by the reference numeral 62.

At the lower terminal end of the section 3 is a platform 63, one edge of which immediately underlies the platform 57, as shown in Fig. 14, and the opposite edge of which lies in spaced relation to the inner surface of the wall 21 after the manner of the platform 51. The slotted space between the edge of the platform 63 and the inner surface of the wall 21 is indicated in Fig. 10 by the reference numeral 64. The inner end edge 65 of this platform extends diagonally from the wall 21 toward the wall 22, as best shown in Figs. 10 and 14. With reference to Fig. 11, it will be noted that the platform 63 has a depending flange 66 which is secured between the beam 36 and the filler member 49, and that the opposite edge of the platform finds a support upon the upwardly inturned edge portion 67 of the flange 23 of the plate 22. A bracket 68 is secured between the flange 66 and the under side of the platform 63 and helps to rigidify and support the latter.

Assuming that the cartons pass into the upper end of the section 3 with the flaps 4 underlying the flaps 5 and with the latter flaps 5 adjoining the sides of the section, the cartons are thus delivered from the conveyer section 1 onto the platform composed of the elements 39 and 47. As the carton is advanced beyond the inner edges of the elements 39—47, the flap 5 at one side will be supported by the platform 38, whereas the flap on the opposite side and adjoining the plate 21 will be unsupported and will drop downwardly into the space between the inner edges of the elements 47 and 39 and the inclined edge 53 of the platform 51. As the leading edge of the flap 5 meets the diagonal edge 53 with its depending flange 54, it is forced down into a vertical position, in which position it eventually enters the slot 56 between the outer edge of the platform 51 and the plate 21. As the advance movement of the carton continues, the opposite one of the flaps 5 is released in the space between the edges of the elements 38 and 52 and the inclined edge 59 of the platform 57, so that that flap also, dropping downwardly, is eventually forced into a fully depending vertical position in which it enters the slot 62 between the inner surface of the plate 22 and the adjoining edge of the platform member 57. Both of the flaps 5 are now fully opened, while the flaps 4 still remain closed, and in this condition the carton is delivered from the section 3 to the section 7.

It is to be noted that in the event that one of the flaps 5 should underlie the other and be thereby prevented from dropping downwardly into the first of the spaces in the section 3, between the inner edges of the elements 38, 39 and 47 and the inclined edge 53, which space is indicated at A in Fig. 10, then the opposite flap 5 having opened into the space B will release the first flap so that the latter may drop downwardly and be opened in the space C and by action of the inclined edge portion 65 of the platform 63. It is to be noted also that the slot 56 extends continuously from the base of the inclined edge portion 53 of the member 51 to the end of the section 3, so that once a carton flap has entered this slot, it will be positively held in the fully open position until delivery to the section 7. Still further, it is to be noted that the plates 22 and 21 may be adjusted transversely as previously described to accommodate cartons of various sizes, the result of such adjustment being illustrated in Figs. 11 and 12.

Referring now to Figs. 2 and 16 to 19, inclusive, the cartons 2 pass from the lower end of the section 3 onto a conveyer 69 which is composed of two chains 71, 71. The ends of the chains 71 which adjoin the lower end of the section 3 are supported on sprockets 72 on a shaft 73 journaled in a sub-frame 74. This sub-frame, which is supported at one end on a shaft 75 and at the other end upon an adjusting screw 76, consists of two angle bars 77 which extend longitudinally of the section 7 and which are connected at their opposite ends by suitable cross bars 78 and 79, see Figs. 18 and 17. The shaft 73 is journaled in these bars 77 at the end of the frame which adjoins the section 3, and this end of the frame comprises and is supported on two upright angle bars 81, to the lower ends of which are secured journal elements 82 which embrace the shaft 75. This latter shaft is journaled on brackets 83 secured to the fixed frame of the apparatus, as shown in Fig. 18. Struts 84 extend from the lower ends of the bars 81 diagonally to the under sides of the longitudinal frame bars 77, as best shown in Fig. 16. The adjusting screw 76 which supports the opposite end of the frame 74 is rotatably supported by a collar 85 upon the member 86 of the main frame, the screw having at its lower end a crank 87 by means of which it may be turned in the frame. The upper end of the screw, as shown in Figs. 16 and 17, is threaded into a block 88 which is adjustably held on the sub-frame 74 whereby to compensate for the changing angular relation between the sub-frame and the adjusting screw 76 as the former is shifted about the shaft 75 as a pivot.

It will be noted by reference to Fig. 18 that the sub-frame 74 is of lesser width than the cartons 2, and that when the cartons pass from the section 3 onto the conveyers 69, the flaps 5, 5 of the carton have been fully opened and are in a depending position, as previously described and as illustrated in Fig. 18. The flaps 4, 4, however, are still unopened, and these flaps rest upon the conveyer chains 71, 71, it being noted by reference to Fig. 18 that the chains find a bearing upon the upper edges of the longitudinal bars 77 and, therefore, provide a substantially rigid movable support for the cartons.

At the entering end of the section 7 are a pair of deflector plates 89, one at each side of the sub-frame 74, these deflector plates passing inwardly of the depending flaps 5 and maintaining the flaps in the fully open position, as shown in Fig. 18. The deflector plates 89 are secured to channel elements 91, 91 which are secured to and are supported on uprights 92, 92, these uprights, as shown in Fig. 17, being supported at top and bottom respectively upon threaded rods 93 and 94, these rods being threaded at opposite ends with right and left-hand threads respectively which are engaged with the respective rods 92. These rods are connected by means of a chain 99 and sprockets 95 and 96 and may be simultaneously rotated through a crank 97 so as to adjust the rods 92 toward or away from each other so as to reduce or increase the space between the troughs 91. The uprights 92 also provide support for guide rails 98 which extend longitudinally of the main frame, in which frame the ends of the threaded rods 93 and 94 are journaled, as shown in Fig. 17.

The troughs 91 extend horizontally as shown in Fig. 16, and as the cartons move downwardly on the inclined conveyer 69, the lower edges of the depending flaps 5 are brought into engagement with the bottoms of the troughs, as shown in Figs. 16 and 17, so that the cartons are supported upon the flaps 5 which now slide in the troughs 91. The movement of the cartons in the horizontal trough is effected by action of the conveyer 69 and by the pressure of the following cartons moving downwardly in the conveyer section 3. As the cartons advance in the troughs 91, they leave the conveyer 69 as shown in Fig. 16, and since the chains 71 of the conveyer 69 are the only active support for the flaps 4, 4 of the cartons, these flaps now tend to open under the weight of the bottles in the carton. This gradual opening of the flaps 4 continues until the leading one of these flaps passes from engagement with the end of the conveyer 69, at which point the weight of the bottles causes the flap to fully open, as shown in Fig. 16, whereby the bottles are deposited upon the belt conveyer 8, the upper end of which underlies the lower end of the conveyer 69, as best shown in Fig. 16. Continued movement of the carton in the troughs 91 eventually releases the trailing one of the flaps 4 so that the bottles sustained by this flap are also deposited, as most clearly shown in Fig. 16, on the conveyer 8.

The conveyer 8 operates at one end upon a roller 101 which is located below the lower end of the conveyer 69 and which is carried by a shaft 102 journaled in the main frame of the apparatus. That portion of the upper run of the conveyer 8 which adjoins the pulley 101 extends horizontally from said roller in the direction of movement, as indicated by the arrow in Fig. 16, this horizontal portion of the conveyer being supported at one end by an idler pulley 103 on the fixed framework of the apparatus. Since the bottles pass from the cartons at a position close to the lower end of the conveyer 69, they drop by gravity upon this horizontal portion 104 of the belt conveyer 8. From the idler pulley 103, the belt extends downwardly at an angle, see Fig. 2, to a point where the tops of the bottles which have passed from the cartons 2 onto the belt clear the lower edges of the downturned flaps 4 and 5 and lie below the level of the troughs 91 in which the cartons are movably supported, as previously set forth. At its lowermost point, the upper run of the conveyer 8 is guided downwardly between idler pulleys 105 and around an idler pulley 106 which permits a change in direction of the said upper run without destroying the effective continuity of the belt. Beyond the rollers 105 the belt 8 extends in a horizontal direction, as shown in Figs. 2 and 3, until as previously described the bottles traveling on the conveyer 8 are deposited on the cross conveyer 9. By reference to Fig. 2, it will be noted that the conveyer 8 passes between side rails 107 which are suitably supported in the frame, these side rails maintaining the bottles against possible lateral displacement; and towards the lower end of the inclined portion of the upper run of the conveyer 8 and onwardly toward the end of the run, guide rails 108 are provided which function to the same end. At its lower extremity, the conveyer 8 passes around a roller 109, see Fig. 3, and then returns by the lower run and by way of guide pulleys 111 and 112 to the roller 101.

The cartons 2 after delivery of the contained bottles to the conveyer 8 are advanced in the troughs 91 as previously described and are subsequently delivered to a trough 113 which extends over the conveyer 8 and terminates in a transversely extending portion 113 paralleling the conveyer 9, as shown in Figs. 3, 5 and 7. At the juncture of the trough 113 with the transverse portion 114, the floor of the said trough 113 terminates in a diagonally disposed and downwardly inclined portion 115, the upper edge of this portion defining a diagonal line 116, as shown in Fig. 5. When the cartons 2 which are still supported on the depending flaps 4 and 5 advance to the line 116 they overbalance in the direction of the extension 114, as indicated in Figs. 5 and 7, and as they move downwardly on the inclined portion 115, they engage a transverse rod 117, see Fig. 7, which has the effect of turning the carton completely over so that it comes to rest right side up upon the belt conveyer 12 which extends through the bottom of the extension 114. This belt conveyer 12 parallels the conveyer 9.

Referring again to Fig. 9 and as previously described, the cartons 2 are provided with an interior partition element, this partition being loose in the box and tending when the flaps 4 and 5 are opened as described above to pass from the carton with the bottles. In order to prevent this displacement of the partition elements from the cartons, we provide an endless chain 119 which extends centrally between and in alignment with the guide troughs 91. As shown in Fig. 16, this chain runs in a plane which directly overlies the upper horizontal portion 104 of the conveyer belt 8. In that section which immediately overlies the said horizontal portion 104 of the conveyer within which the bottles are deposited upon the latter as described above, the chain 119 is guarded by an overlying guard rail 121 which is shown best in Figs. 16 and 19. This guard rail is supported upon a bracket 122 at one end, which bracket is secured to the fixed framework of the apparatus, and the forward end thereof rests upon the chain 119, see Fig. 19. The guard rail 121 is of a character to deflect the bottles to opposite sides of this rail if the latter are dropped from the containers too close to the longitudinal center line of the belt 8, and also prevents the bottles from contacting the chain 119. The chain continues to and through the trough 113 to the point where this trough joins the transverse extension 114, the chain which is indicated in broken lines in Fig. 3 passing around idler sprockets 123 and 124 as shown. Initially, as each carton passes from the end of the conveyer 69 and the flaps are forced to the fully open position by the weight of the bottles which pass downwardly to the belt 8 as described, the partitioning element 6 if it tends to drop downwardly by gravity will find a support upon the guard rail 121, and after termination of this rail upon the chain 119. The partitioning element is thus prevented from falling beyond the lower ends of the depending flaps 4 and 5, and when the inverted container is righted at the end of the trough 113 as previously described, this element will retain its position between the flaps and will then drop by gravity back into the bottom of the carton.

The several conveyers and the chain 119 are driven from a motor 125 which is mounted on a horizontally pivoted bracket 126 in the bottom of the frame, as shown in Fig. 17. The motor 125 is connected by a belt 127 to a pulley 128 which is carried on one end of a shaft 129. This shaft is journaled, as shown in Fig. 17, on a frame 131 which is pivotally supported at 132 on the fixed frame of the apparatus and which is engaged at the top by a spring 133 which exerts pressure tending to force the frame in a direction to tighten the belt 127. As shown in broken lines in Fig. 17, the spring 133 is adjustable to vary the tension upon the frame 131, and through the frame upon the belt 127.

At the opposite end of the shaft 129 is a pulley 134 which is connected by a belt 135 with a pulley 136 mounted on a stub shaft 137 secured in an arm 138, this arm being adjustably secured to the main frame. The stub shaft 137 also supports a pulley 139 which is connected by a belt 141 with a pulley 142 on the input shaft 143 of a variable speed unit 144. The output shaft 145 of the unit 144 is connected by means of a chain 146 and sprockets 147 and 148 to the shaft 102 of the roller 101 of the belt 8. The shaft 102 carries a second sprocket 151, and this sprocket is connected by a chain 152 to a sprocket 153 on the shaft 75. This shaft carries at its center portion two sprockets 154 and 155, the latter of these sprockets constituting the drive means for the chain 119 previously described, it being noted from Fig. 16 that the lower run of this chain passes to the sprocket 155 through a channel-like guide 156. The sprocket 154 is connected by a chain 157 to a sprocket 158 on the shaft 73, which shaft carries the sprocket 72 for the conveyer chains 71, 71. The several elements of this transmission are best illustrated in Figs. 16, 17 and 18.

It will be noted by reference to Fig. 17 that the mounting of the motor and of the tensioning pulley 128 provides for maintaining the several belts 127, 135 and 141 in taut condition. The arm 138 which carries the pulleys 136 and 139 is left loose for adjustment about its pivot bolt 159 until the several belts art taut, after which this pivot bolt 159 is tightened to immobilize the said pulleys.

The embodiments of the invention illustrated in Figs. 20 to 22 correspond in essential respects to the embodiment described above, and the corresponding parts are, therefore, designated by the same reference numerals. The embodiments of Figs. 20 and 22 are identical except in the latter the section 3 extends upwardly to its juncture with the section 7 instead of downwardly as in the former. In both cases, however, the belt conveyer 8 upon which the bottles are deposited from the cartons extends throughout its length in a horizontal direction, and the required divergence between this belt and the carton guide troughs 91 is afforded by an upward inclination of the latter to a point where the cartons will be entirely clear of the bottles moving on the horizontal belt 8. In both cases, also, the cartons are positively moved in relatively spaced relation by means of an endless conveyer 161, which may take the form of separate longitudinal endless chains 162, 162 which are connected at intervals with cross bars 163, these cross bars being sufficiently far apart to admit the cartons therebetween, as clearly illustrated in the drawings, and acting to advance the cartons through the section 3, and subsequently through the troughs 91 and 113. By this means, the bottles are deposited in spaced groups upon the conveyer belt 8 as illustrated. In Fig. 22, transfer of the cartons from the section 3 to the conveyer 69 is provided for by extending the terminal platform 63 beyond the end of the trough as shown so as to afford the necessary support for the carton until it passes on to the conveyer.

In Figs. 23 to 25, inclusive, we have illustrated a modification of the flap-opening means of the section 3. In this case, the sides of the trough-like guide are composed of rails 164 which are supported on arms 165 of rotary uprights or posts 166. The posts are connected by a cross link 167 whereby rotation of the posts will result in a simultaneous transverse movement of the rails 164 in opposite directions, thus providing for adjustment of the effective width of the guide section. The bottom of the trough upon which the cartons 2 are supported, as illustrated in Fig. 25, consists of a rail 168, the ends of which are suitably supported upon the fixed framework of the machine as indicated diagrammatically at 169 in Fig. 25. Adjoining longitudinal sections of the rail 168 are offset transversely as best shown in Fig. 23, these offset portions providing for release of first one and then the other of the flaps 5 of the cartons 2 as illustrated in Fig. 25. As the cartons approach the end of this section, the depending flaps are engaged by diverging spring arms 171 which resiliently force the flaps outwardly to an extent insuring their passage outside of the guide plates 89 by means of which the flaps are directed into the troughs 91 as previously set forth.

It will be noted that the rails 164 may be locked in adjusted position by means of a pin 172 which is engaged in an arm 173 on one of the rotary posts 166 and enters one or other of a series of apertures 174 in a relatively fixed segment 175 immediately below the arm 173.

In the embodiment of the invention shown in Figs. 26 and 27, a conveyer is employed for the cartons 2 similar to the conveyer 161 of the embodiment of Figs. 20 to 22, the conveyer being designated by the same reference numerals. This embodiment employs a trough 176 the floor of which is somewhat depressed along the center line as illustrated at 177 so that the flaps 5, 5 will tend to drop slightly from the body of the container as shown. A projecting tongue 178 enters the space between the slightly opened flaps and the body of the container and acts to support the carton as the latter leaves the terminal end of the trough 176. Beyond the end of this trough, the sides of the tongue 178 diverge, so that they act as a wedge upon the flaps 5 to spread the latter laterally and finally into a horizontal position resting upon the floor plate 179 of a guide trough 181 which extends at right angles to the trough 176, the side walls of this guide trough 181 being formed by rails 182, 182. The cartons are moved longitudinally of the guide trough 181 by a flight conveyer corresponding substantially to the conveyer 161 of the trough 176. In this case, however, the side chains 183 of the conveyer extend over the tops of the cartons, as clearly illustrated, and are provided with interconnecting depending plates 184 which engage the cartons and cause them to move longitudinally with the conveyer on the floor plate 179 of the guide trough 181. Sections at opposite sides of the floor plate 179 are cut away as illustrated to an extent releasing the flaps 4 and permitting these flaps to drop downwardly under the weight of the bottles within the carton in the manner previously described so as to deposit the bottles from the carton onto an underlying belt conveyer 185.

It will be noted by reference to Fig. 27 that guide rails 186 are provided at opposite sides of the conveyer 185 so as to limit the movement of the flaps 4 whereby these flaps function temporarily as a means for confining the released bottles in a proper upright position on the conveyer belt. It will be noted also that at the inner edge of each of the cutout portions 187 of the floor plate, through which openings the flaps 4 are permitted to drop downwardly as described, a depending plate 188 is provided, these plates occupying a position substantially at the mid section of the overlying carton and acting to guide and to support the bottles as they pass downwardly from the carton onto the belt 185.

Instead of the apparatus shown in Fig. 26 for opening the flaps 4 to release the bottles from the cartons, we may employ the device shown in Fig. 28. In this case, instead of the flat floor plate 179 of the other embodiment, we employ a centrally depressed floor structure consisting of two side plates 189 converging inwardly and downwardly toward each other, and in conjunction therewith a tongue 191 at the end of a flat floor plate 192 which is aligned with the plate 189. The tongue 191 overlaps and extends endwise into the depression of the plates 189, the relatively narrow extremity 193 of the tongue being offset downwardly in parallel misalignment with the body of the plate 192 and being joined to the latter by an inclined rearwardly expanding portion 194.

In this instance, the cartons 2 are advanced on the plates 189 by a chain conveyer 195 having depending lugs 196 for engagement with the cartons as illustrated. The flaps 5, 5 being opened and spread outwardly on the plate 189 after the manner for example shown in Fig. 26, the inner flaps 4 will be supported on the plates 189 in the manner shown in Fig. 31, the weight of the bottles in the carton pressing the flaps 4 down flatly upon the convergently inclined surfaces of the floor plates. The offset extremity 193 of the tongue 191 is thus permitted to enter within the flaps 4, and between the flaps and the bottles, as clearly illustrated, and the continued advancement of the cartons will, under these conditions, cause the bottles to ride up the incline 194 onto the flat plate 192. The flaps 4, on the other hand, will drop downwardly at the sides of the plate 192 when the support afforded by the plates 189 is terminated. At each side of the plate 192 is an inclined guide flange 197 which guides the flaps 4 into a depending position, as shown in Fig. 28, and directs the lower ends of the flaps into troughs 198 which starting below the plane of the plate 192 are inclined upwardly with respect to this plane as illustrated.

At the end of the plate 192 is a conveyer 199, the upper run of this conveyer being in the same plane as the plate 192 and forming in effect a continuation of the latter. The bottles, therefore, which are caused to rest upon the plate 192 as previously described are by the movement of the cartons carried onto the conveyer 199 on which they are conducted to a suitable point of disposition. The lower edges of the depending flaps 4 are guided upwardly in the channels 198, the flaps acting as supports for the cartons and thereby gradually lifting the cartons from the bottles resting on the conveyer 199. The conveyer 199 and the chain 195 are synchronized so that the rate of movements of the bottles and the cartons is such as to effect a clean separation of the cartons from the bottles, leaving the latter upright on the conveyer 199.

As shown in Fig. 28, the conveyer 199 comprises two longitudinal belt elements 201, 201 which are separated at the centers sufficiently to permit of passage therebetween of an endless cord element 202, this element passing around a sheave 203 at one end and being guided so that the upper run thereof will parallel the guide troughs 198 and the upwardly inclined section of the chain conveyer 195. The upper run of the element 202 underlies the open end of the carton and will act to support a partitioning member 204 corresponding to the member 6 previously described, thereby retaining this element in the carton until such time as the position of the latter is reversed. This belt element 202 also functions in part to support the flaps 5 of the carton and to take a portion of the weight of the carton itself off of the supporting flaps 4. It will be noted that this form of the device is of advantage in that the carton is lifted from the bottles instead, as in the other embodiments, of effecting the separation by a gravity movement of the bottles from the cartons. This embodiment, when combined with the form of the device illustrated in Fig. 26 as previously set forth, is also of advantage by reason of the relative simplicity of form and structure.

There may be other modifications without departure from the invention as defined in the appended claims.

We claim:

1. In apparatus for opening and emptying cartons of the character described, the combination with a guide for the cartons, of means for advancing the cartons successively in inverted positions along the guide, means in the guide for opening the outer pair of the closure flaps of the cartons, and means in the guide for subsequently releasing the inner pair of closure flaps so as to permit discharge of the contents from the carton.

2. In apparatus for opening and emptying cartons of the character described, the combination with a guide for the cartons, of means for advancing the cartons successively in inverted positions along the guide, means in the guide providing for release of the two outer closure flaps of the carton, means for adjusting the said flaps to substantially vertical positions at the opposite sides of the carton, means in the guide for transferring the support of the carton to the said flaps so as to release the inner closure flaps, and means underlying the guide for reception of the contents of the carton.

3. In apparatus for opening and emptying cartons of the character described, the combination with means for advancing the cartons in inverted positions successively over a predetermined path, of means in said path for first opening the outer closure flaps and for subsequently releasing the inner closure flaps so as to permit discharge of the contents from the carton.

4. In apparatus for opening and emptying cartons of the character described, the combination with means for advancing the cartons in inverted positions successively over a predetermined path, of means in said path for first opening the outer closure flaps and for subsequently releasing the inner closure flaps so as to permit discharge of the contents from the carton, and a conveyer underlying the said path for reception of said contents.

5. In apparatus for opening and emptying cartons of the character described, the combination with means for advancing the cartons in inverted positions successively over a predetermined path, of means in said path for first opening the outer closure flaps and for subsequently releasing the inner closure flaps so as to permit discharge of the contents from the carton, and a conveyer underlying the said path for reception of said contents, said conveyer being relatively close to said path at the point of said discharge and diverging in the direction of movement from the path.

6. In apparatus for opening and emptying cartons of the character described, the combination with a guide for the cartons, of means for advancing the cartons successively in inverted positions along the guide, means in the guide for permitting the outer closure flaps to swing downwardly toward the opposite sides respectively of said guide, means for adjusting said flaps into substantially vertically depending positions in the guide, a conveyer positioned to receive the cartons with the said flaps depending at each side thereof so that the inner closure flaps are suppported by the conveyer, and trough elements in said guide for receiving the lower edges of the depending flaps to thereby support the cartons on the latter whereby as the cartons leave the conveyer the said inner flaps are permitted to swing downwardly toward the front and rear of the carton respectively and to thereby release the contents from the carton.

7. In apparatus for opening and emptying cartons of the character described, the combination with a guide for the cartons, of means for advancing the cartons successively in inverted positions along the guide, means in the guide for permitting the outer closure flaps to swing downwardly toward the opposite sides respectively of said guide, means for adjusting said flaps into substantially vertically depending positions in the guide, a conveyer positioned to receive the cartons with the said flaps depending at each side thereof so that the inner closure flaps are supported by the conveyer, trough elements in said guide for receiving the lower edges of the depending flaps to thereby support the cartons on the latter whereby as the cartons leave the conveyer the said inner flaps are permitted to swing downwardly toward the front and rear of the carton respectively and to thereby release the contents from the carton, and a second conveyer immediately underlying the guide at the terminal end of said first-named conveyer, said second conveyer traveling in the same general direction as the cartons in said guide and diverging from the latter in the direction of travel.

8. In apparatus for opening and emptying cartons of the character described, the combination with a guide for the cartons including means for supporting the cartons in inverted positions, of means for advancing the cartons successively along the guide, said supporting means having transversely extending recesses arranged respectively for release of the outer closure flaps so as to permit the flaps to swing downwardly toward the opposite sides of the guide respectively, cam elements associated with said recesses for adjusting the said flaps after release to a substantially vertical position in which they are adapted to constitute a support for the carton, and means in said guide at the terminal end of said supporting means for receiving the lower edges of said depending flaps and providing a support for the flaps upon which the latter may react to sustain the carton and to thereby release the inner closure flaps to permit the contents to discharge from the carton.

9. In apparatus for opening and emptying cartons of the character described, the combination with a guide for the cartons including means for supporting the cartons in inverted positions, of means for advancing the cartons successively along the guide, said supporting means having transversely extending recesses arranged respectively for release of the outer closure flaps so as to permit the flaps to swing downwardly toward the opposite sides of the guide respectively, cam elements associated with said recesses for adjusting the said flaps after release to a substantially vertical position in which they are adapted to constitute a support for the carton, means in said guide at the terminal end of said support means for receiving the lower edges of said depending flaps and providing a support for the flaps upon which the latter may react to support the carton and to thereby release the inner closure flaps to permit the contents to discharge from the carton, and means for adjusting the effective width of said guide.

10. In apparatus for opening and emptying cartons of the character described, the combination with a guide for the cartons, of means for advancing the cartons successively in inverted positions along the guide, means in one portion of the guide for releasing the outer pair of closure flaps and for adjusting said flaps to substantially vertical positions at the opposite sides of said guide, trough elements in another portion of said guide adapted to receive the lower edges of said depending flaps to thereby provide a support for the cartons through the flaps, and a conveyer forming a connecting link between said guide portions and being angularly adjustable in vertical planes with respect to said portions, said conveyer constituting a support for the inner closure flaps and providing for release of said flaps at the terminal end thereof.

11. In apparatus for opening and emptying cartons of the character described, the combination with a support for the cartons and means for advancing the cartons on the support in inverted position and endwise with respect to a pair of closure flaps at the under side of the carton, and a second support positioned in the path of the carton and arranged to receive the latter by displacement from the first support, the proximate end of the last-named support being arranged to enter above the said flaps so as to permit the flaps to open downwardly to the sides while the carton is maintained upon the support.

12. Apparatus according to claim 11 wherein the first-named support is formed with downwardly converging side portions providing for partial release of the said flaps affording an open space for admission of the said proximate end of the second support.

13. Apparatus according to claim 11 wherein the first-named support is formed with downwardly converging side portions providing for partial release of the said flaps affording an open space for admission of the said proximate end of the second support, and wherein further the said end is provided with a downwardly offset narrow extremity joined to the body of the support by means of an inclined laterally expanding portion.

14. In apparatus for opening and emptying cartons of the character described, the combination with a support for the cartons and means for advancing the cartons on the support in inverted position and endwise with respect to a pair of closure flaps at the under side of the carton, a second support positioned in the path of the carton and arranged to receive the latter by displacement from the first support, the proximate end of the last-named support being arranged to enter above the said flaps so as to permit the flaps to open downwardly to the sides while the carton is maintained upon the support, a conveyer forming a continuation of the said second support in the direction of travel of the carton, and guide means for the carton extending upwardly and away from the conveyer also in the direction of movement of the carton, said guide means providing for gradual elevation of the inverted carton from said conveyer.

15. Apparatus according to claim 14 wherein the said guide is paralleled by an element immediately underlying the open under side of the carton so as to prevent displacement from the carton of a contained partitioning structure.

16. In apparatus for opening and emptying cartons of the character described, the combination with a support for the cartons and means for advancing the cartons on the support in inverted position and endwise with respect to the outer pair of closure flaps at the under side of the carton, a second support positioned in the path of the carton and arranged to receive the latter by displacement from the first support, the proximate end of the last-named support being arranged to enter upon the said flaps so as to permit the flaps to open downwardly to the sides while the carton is maintained upon the support, means for guiding the flaps to a transversely extended position resting upon said second support, means for changing the movement of the carton on the second support to a direction endwise with respect to the inner pair of closure flaps, a third support positioned in the path of the carton and arranged to receive the latter by displacement from the second support, the proximate end of the third support being arranged to enter above the said inner flaps so as to permit the flaps to open downwardly to the sides while the carton is maintained upon the support, and means for elevating the carton from the support.

17. Apparatus in accordance with claim 16 wherein a conveyer is provided as a continuation of the said third support and adapted to support the contents of the carton after the latter has been withdrawn from the conveyer.

18. In apparatus for opening and emptying cartons of the character described, the combination with support means for the cartons and means for advancing the cartons in inverted positions on the supports, and means for opening the closure flaps at the under side of said cartons so as to deposit the contents of the latter on said support.

19. Apparatus in accordance with claim 18 wherein means is provided for withdrawing the cartons from the support and away from the said deposited contents.

20. In apparatus for opening and emptying cartons of the character described, the combination with a support for the cartons, of means for advancing the cartons in inverted position on the support, means operatively associated with the support to provide for opening of the closure flaps at the under side of the carton so as to deposit the contents of the carton on the support, means for separating the carton from the contents, and means associated with said separating means for preventing displacement from the inverted cartons of a loosely inserted separator structure.

STEPHEN G. SEIDEL.
ROBERT P. LOWNES.